Oct. 11, 1955
H. DOYLE
2,720,280
METHOD OF TREATING GASES
Filed Feb. 25, 1953
2 Sheets-Sheet 1
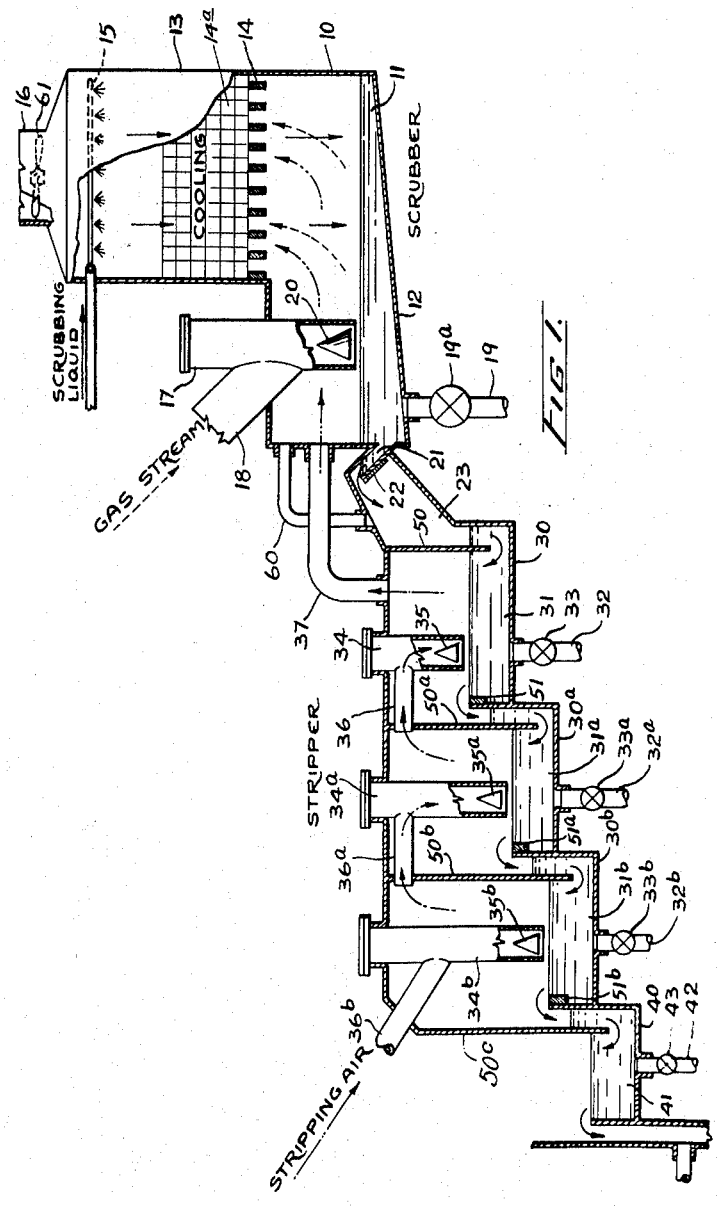
Harold Doyle
Inventor
Attorney Oct. 11, 1955
H. DOYLE
2,720,280
METHOD OF TREATING GASES
Filed Feb. 25, 1953
2 Sheets-Sheet 2
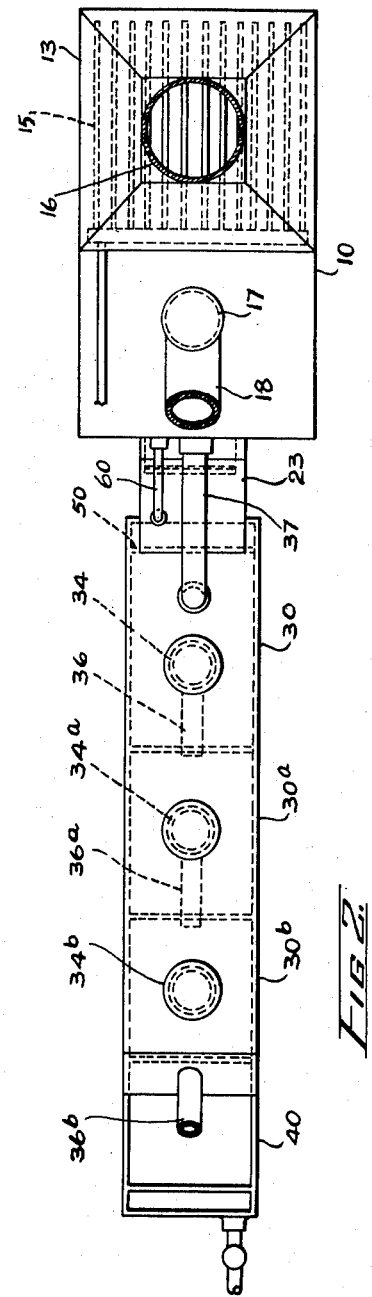
Harold Doyle
Inventor,
Attorney

United States Patent Office 2,720,280
Patented Oct. 11, 1955

2,720,280

METHOD OF TREATING GASES

Harold Doyle, Trail, British Columbia, Canada, assignor to The Consolidated Mining and Smelting Company of Canada Limited, Montreal, Quebec, Canada, a corporation of Canada Application February 25, 1953, Serial No. 338,831

4 Claims. (Cl. 183—115)

This invention relates to a method for the treatment of industrial gases.

Methods and apparatus for removing suspended particles from industrial gases are well known and are widely used, for example spray towers, centrifugal scrubbers, bag filters, cyclone separators and electrostatic precipitators. Ordinarily, a gas cleaning method and/or apparatus is selected with regard to the nature of the gases and materials to be treated and with regard also to economic considerations upon which may depend the extent to which the gases can be purified.

United States Patent No. 2,621,754, issued December 16, 1952, discloses a method and apparatus for separating suspended particles of matter from industrial gases in which a stream of gas containing suspended solid particles is discharged downwardly at high velocity into a bath of scrubbing liquid whereby the solid particles are driven into and retained by the scrubbing liquid. The direction of the gas stream is reversed and the gas stream, substantially free from suspended solid particles, is discharged from the apparatus. A suitable scrubbing liquid, such as water, is continually added to and withdrawn from the apparatus to maintain a relatively uniform volume.

It is found in the operation of apparatus of this type in which solid particles suspended in a gas stream are separated therefrom by a scrubbing liquid that constituents of the gas stream may be physically absorbed by the scrubbing liquid. For example, in the treatment of gases containing sulphur dioxide, it is found that sulphur dioxide is physically absorbed by the scrubbing liquid. Thus, there is a possibility of loss of economically valuable constituents from the gas stream and, also, a problem is created in the disposal of the scrubbing liquid.

I have found that gases physically absorbed by the scrubbing liquid during the separation of the solid particles from the gas stream can be quickly, easily and inexpensively stripped or released from the scrubbing liquid. Absorbed gas which can be recovered from the liquid by stripping, for example, sulphur dioxide dissolved as such in water, is referred to herein as "physically" absorbed gas to distinguish it from gas which has been chemically fixed in the liquid, for example, sulphur dioxide fixed as ferrous sulphate, and which would not be released by the present method.

The method of the present invention comprises, in general, the steps of discharging a stream of gas to be treated downwardly at high velocity into a bath of scrubbing liquid maintained at a relatively constant volume, whereby solid particles suspended in the gas stream are driven into and are retained by the scrubbing liquid and a portion of the gas from the gas stream is physically absorbed by the scrubbing liquid, separating the cleaned gas stream from the scrubbing liquid, adding liquid to and withdrawing liquid from the bath, passing withdrawn scrubbing liquid to a second bath of liquid, stripping physically absorbed gas from the liquid in the second bath with a gas stream discharged downwardly at high velocity into the scrubbing liquid in the second bath, and separately discharging gas and scrubbing liquid from the second bath.

The invention and the manner in which the method is operated are described in detail hereinafter, reference being made to the accompanying drawings in which:

Figure 1 is a side elevation which illustrates schematically, a preferred embodiment of the invention; and Figure 2 is a top plan view.

Like reference characters refer to like parts throughout the description and drawings.

Referring to the drawings, the numeral 10 indicates a container or tank adapted to receive a bath of scrubbing liquid indicated by the numeral 11. The scrubbing liquid is preferably water but other suitable liquids can be employed. The tank 10 is preferably horizontally elongated and is provided with a sloping floor or bottom 12.

A tower 13 is positioned above and is in communication with the shallow end of the tank. The tower is provided with a packing 14a, such as Raschig rings or the like, supported on grid 14. Sprays 15 discharge fresh, cool scrubbing liquid into the upper part of the tower to flow down through the tower into the tank 10. Cleaned gas passing upwardly through the tower is further cooled by contact with the descending liquid and discharges through exit conduit 16 and an exhaust fan 61.

A vertically disposed gas inlet conduit 17 is mounted above and extends into the deep end of the container terminating in a discharge or outlet end positioned above but adjacent to the surface level of the liquid bath. A gas conduit 18, connected to a source of industrial gas is connected to the conduit 17.

A throttle member 20, which is preferably cone-shaped, is concentrically positioned in the lower part of the conduit 17, adjacent to the outlet end thereof. This throttle member 20 is preferably adjustably mounted in the outlet end of conduit 17 and is designed to increase substantially the velocity of the gas stream at the point of discharge from the conduit. The conduit 17 is extended upwardly beyond the point of connection with the conduit 18 to provide access to the throttle member for cleaning and for servicing, if necessary.

An outlet 19 is provided in the bottom of the container at the deep end for draining the tank when desired. A valve 19a is provided in this outlet and normally is closed during the operation of the apparatus.

Gas containing suspended solid particles is discharged at high velocity from the outlet end of conduit 17 into the bath of scrubbing liquid. The interaction of the high velocity of the gas stream and the liquid bath results in a splash effect which forms a dense spray. The solid particles suspended in the gas stream are driven into and are retained by the liquid. The direction of flow of the cleaned and cooled gas is reversed and the gas passes upwardly into the tower 13, the grid 14 and the lower part of the tower packing 14a serving to separate and return to the scrubbing liquid any spray entrained with the gas stream. The cleaned gas is further cooled by fresh scrubbing liquid discharged from the sprays 15 and enters the outlet conduit 16 in ideal condition for subsequent treatment for the recovery of economically valuable constituents.

The container 10 is provided, at its deep end, with an outlet 21 from which the scrubbing liquid can flow freely while maintaining a desired volume in the container. The outlet 21 in a preferred form is a sloping channel into which the scrubbing liquid rises to the level of the liquid in the container, the desired level being controlled by an adjustable baffle or weir 22.

The scrubbing liquid discharged from the outlet 21 flows in sequence through stripping tanks 30, 30a and 30b, wherein the liquid is stripped of any physically absorbed gases which have been absorbed from the main gas stream, and the liquid is discharged to a collecting tank 40 from which it is discharged from the system. The stripping tanks are similar in construction and operation and a sufficient number is provided to ensure the substantially complete stripping of the physically absorbed gases from the scrubbing liquid.

Each stripping tank of the series comprises a container adapted to receive a bath of scrubbing liquid indicated by the numerals 31, 31a and 31b. A drain pipe 32, 32a and 32b, is provided in the bottom of each container and a valve 33, 33a and 33b, is provided in each drain pipe. The drain pipes are provided to permit cleaning the tanks and the valves are normally closed during operation of the system.

A vertically disposed gas conduit 34, 34a and 34b, is mounted in each container with the discharge end positioned immediately above the surface level of the scrubbing liquid when quiescent. A throttle member 35, 35a and 35b, preferably similar in design to the throttle member 20, is mounted in each conduit 34, 34a and 34b adjacent to the outlet end thereof.

In the present example, the container 30b is the final stripping tank of the series. An air conduit 36b is connected to the vertically disposed conduit 34b. A conduit 36a extends between the upper part of the container 30b and the vertically disposed conduit 34a, a conduit 36 extends between the upper part of the container 30a and the vertically disposed conduit 34, and a conduit 37 extends between the upper part of the container 30 and the container 10. In operation, air is discharged at high velocity into the bath of scrubbing liquid in container 30b, thereby releasing physically absorbed gas from the scrubbing liquid. The air and released gas pass from container 30b into container 30a where they are discharged at high velocity into the bath in container 30a. Physically absorbed gas is released by this operation, and the air-gas mixture passes to container 30. The air-gas mixture is injected at high velocity into the bath in container 30, releasing physically absorbed gas, and the resultant mixture of air and released gas is passed through conduit 37 to container 10 where the mixture is combined with the cleaned gas stream. The combined gas stream passes upwardly through the tower to conduit 16 and is discharged from the system by means of fan 61. Thus, air alone is injected into the scrubbing liquid with the lowest concentration of physically absorbed gas and passes through the stripping system countercurrent to the flow of scrubbing liquid. In the stripping operation, the liquid is stripped of physically absorbed gas substantially to the limit of natural equilibrium.

The scrubbing liquid discharged from outlet 21 flows into a well or channel 23 defined by an end wall of the container 30 and a baffle 50 which extends from the top of the container to a point above the bottom but below the surface of the liquid bath. The level of the liquid in each container is regulated by an adjustable weir 51—51a and 51b. The scrubbing liquid flows in sequence through the containers 30, 30a and 30b, to the collecting container 40 from which it can be discharged to waste, or the solids can be separated such as by filtration and the scrubbing liquid can be cooled and returned to the system by way of the sprays 15. Each container is sealed from the next adjacent container by the provision of vertically disposed baffles 50, 50a, 50b, 50c which extend from the top of each container to a point above the bottom but below the level of the scrubbing liquid in each container.

In operation, the gas to be treated flows from the conduit 18 into conduit 17 wherein the velocity is greatly increased as it passes the throttle member 20 and is discharged from the conduit 17 into the bath of scrubbing liquid at a relatively high velocity to the extent that the gas stream penetrates deeply into the bath of scrubbing liquid. The direction of flow of the gas stream is reversed within the bath and the gas, relieved of its dust burden, passes upwardly out of the bath, through the grid 14 into the cooling tower 13 and upwardly through the tower to outlet conduit 16. The exit gas which has been cooled and cleaned can be treated for the recovery of one or more of its constituents in a subsequent process.

Water, or other suitable scrubbing liquid, is fed into the container 10 through the sprays 15, passing downwardly through the tower 13 and through the grid 14. The volume of scrubbing liquid in container 10 is maintained relatively constant by discharging scrubbing liquid through conduit 21 and over the adjustable weir 22. Any gases entrained as such in the liquid passing through the conduit 21 are returned to the container 10 through a gas-lock release device formed by the upper part of the channel 23 and the conduit 60 which extends from the top of the channel 23 to the container 10. The scrubbing liquid discharged through the conduit 21 contains suspended solids removed from the gas stream and may also contain, in solution, soluble constituents of the dust burden of the gas stream and also physically absorbed constituents of the gas stream. Physically absorbed gas constituents in the scrubbing liquid can be recovered by stripping the scrubbing liquid with air or other suitable gas, in the series of stripping units 30b, 30a and 30.

The scrubbing liquid, after passing through the containers 30, 30a and 30b, flows into container 40 from which it is discharged and may be passed to waste or it may be separated from the entrained solid particles and returned to the sprays 15 or, alternatively, treated for the recovery of any values contained therein. A drain pipe 42 is provided in the bottom of the container 40 to permit cleaning the container and a valve 43, which is normally closed during operation of the system, is provided in the drain pipe.

The method and apparatus have been operated with important savings in the treatment of gases containing sulphur dioxide, such as those resulting from roasting mineral sulphides, to clean and cool the gases preparatory to subsequent sulphuric acid manufacture. The hot combustion gases from the roasting operation were passed through a waste heat boiler and cyclone dust separator (not shown) and thence to the scrubbing unit. The gas entering the scrubbing unit contained a dust burden of about 300 mg. per cubic foot and a concentration of sulphur dioxide of about 7.5%. The gas temperature was about 500° F. and the gas flowed at a rate of about 12,250 cubic feet per minute calculated at normal temperature and pressure. The velocity of the gas in the conduit 18 was about 40 feet per second and the velocity was increased as it passed the throttle member 20 to about 175 feet per second. Treatment of the gas in the scrubber unit removed about 99% of the dust burden of the inlet gas and reduced the gas temperature to about 125° F. The cooling tower had negligible effect on cleaning the gas, but reduced the gas temperature to about 90° F. at the outlet and, also, served to separate entrained scrubbing liquid from the gas stream prior to discharging it through conduit 16.

The gas and stripping air were exhausted from the gas scrubber and stripping unit by means of a fan 61 drawing gas through conduit 16. The scrubber container 10 was maintained under a negative pressure of about 18 inches water gauge. This negative pressure was maintained in container 30 of the stripper unit by means of conduit 37 and the gas lock release device formed by the upper part of channel 23 and the conduit 60. Container 30a was under a negative pressure of about 12 inches water gauge and container 30b was under a negative pressure of about 6 inches water gauge.

The amount of sulphur dioxide absorbed by the scrubbing liquid depends on the sulphur dioxide concentration of the inlet gas. In the present example, the inlet gas contained 7.5% sulphur dioxide and 3% of the total sulphur dioxide was physically absorbed in the scrubbing liquid. In order to recover the absorbed sulphur dioxide and to render the scrubbing liquid fit for discharge to waste, the scrubbing liquid was stripped with air in a series of three stripping tanks as described hereinabove. The amount of air used was about 1200 cubic feet per minute calculated at normal temperature and pressure. More than about 95% of the absorbed sulphur dioxide was released from the scrubbing liquid in these units and the sulphur dioxide and air mixture was combined with the main gas stream passing to the cooling tower. Air was drawn in from the atmosphere and discharged into the scrubbing liquid in container 30b at a velocity of about 125 feet per second. The mixture of air and released gas from container 30b was discharged into the liquid in container 30a at a velocity of about 125 feet per second, and the mixture of air and released gas from container 30a was discharged into the liquid in container 30, also at a velocity of about 125 feet per second. The concentration of sulphur dioxide in the gas leaving the cooling tower, was about 6.60%. The reduction in concentration between the inlet gas to the container 10 and the outlet gas was caused, of course, by dilution with air from the stripping operation. The reduction in concentration was relatively small and at the prevailing concentrations the dilution was not uneconomic having regard to the value of the sulphur dioxide recovered from the scrubbing liquid. The operation also eliminated difficulties otherwise inherent in discharging to waste scrubbing liquid containing a high concentration of sulphur dioxide.

The exhaust gas from the cooling tower 13 was in ideal condition for direct treatment in a contact acid plant for the production of sulphuric acid.

The cooling tower 13 provides supplementary cooling capacity and serves to separate any scrubbing liquid entrained with the exit gas. The tower is not required for cleaning as the gas is adequately cleaned of solid particles before passing it to the tower. This is an advantage as the tower can be designed without regard to the necessity of flushing to prevent plugging and caking by solid material that otherwise would be entrained with the gas stream.

The amount of scrubbing liquid discharged into the tower 13 from the sprays 15 is regulated to provide an adequate flow of liquid through the tank and the series of stripping units to ensure a regular flow without undue settling of solids and, also, to provide the desired supplementary cooling. In the foregoing example, the scrubbing liquid was water and the rate of flow through the apparatus was at the rate of about 200 gallons per minute. This amount of water was regulated to obtain the desired decrease in gas temperature as the gas passed through the cooling tower.

In the embodiment of the invention described hereinabove, a cooling tower for supplementary cooling of the gas is desirable. In instances where such supplementary cooling is not required, the tower may be unnecessary, but provision should be made to remove scrubbing liquid from the cleaned gas reflected from the bath. A system of baffles between the inlet conduit and the shallow end of the tank has been found to be satisfactory for eliminating spray.

It will be noted from the foregoing example that the scrubber itself is a very effective cooler.

The method and apparatus of the present invention possesses a number of important advantages in addition to the major features of removing the solid particles entrained with or suspended in a gas stream, cooling the gas stream, and stripping absorbed gases from the scrubbing liquid. The apparatus is compact and requires very little space. The continuous flow of scrubbing liquid through the scrubber and stripping units can be effected solely by gravity thus obviating the need for pumps and associated equipment. Also, the equipment is highly efficient and is relatively simple in its design and relatively inexpensive to construct.

The term "industrial gases" used herein is intended to include any gas which requires treatment prior to discharge to the atmosphere. Such gases include, but are not limited to, combustion gases resulting from the combustion of fuel, such as in steam plants; gases resulting from pyrometallurgical operations, such as in roasting mineral sulphides, and in smelting operations. Such gases may require treatment only for the removal of suspended particles prior to discharge to the atmosphere, or they may contain potentially valuable compounds such as sulphur dioxide which can be recovered after the removal of the suspended solid particles and prior to the discharge of the gas stream to the atmosphere.

Modifications can be made in the preferred embodiment of the invention described hereinabove. For example, the amount of scrubbing liquid used in the method can be varied according to the cooling requirements, gas volumes and dust burden of the treated gas. Also, the amount of stripping air can be varied and the released gas can be recovered separately instead of being added to the gas stream in the scrubbing unit. These and other modifications of the method and apparatus can be made without departing from the scope of the invention as defined by the appended claims.

What I claim as new and desire to protect by Letters Patent of the United States is:

1. The method of treating industrial gases which comprises discharging a stream of gas to be treated vertically downwardly at high velocity into a bath of scrubbing liquid maintained at a relatively constant volume, whereby solid particles suspended in the gas stream are driven into and are retained by the scrubbing liquid and a portion of the gas from the gas stream is physically absorbed by the scrubbing liquid, separating the cleaned gas stream from the scrubbing liquid, adding liquid to and withdrawing liquid from the bath, passing withdrawn liquid to a second bath of liquid, stripping physically absorbed gas from the liquid in the second bath with a gas stream discharged at high velocity into the scrubbing liquid in the second bath, separately recovering the gas stream from the second bath and adding it to the first mentioned cleaned gas stream, and discharging liquid from the second bath.

2. In the method of treating industrial gases which includes the injection of a stream of gas downwardly at high velocity to penetrate deeply into a first bath of scrubbing liquid and reversal of the direction of gas flow within the bath whereby the gas stream is cooled and cleaned and a portion of the gas is physically absorbed by the scrubbing liquid, the improvement which comprises the steps of withdrawing scrubbing liquid containing absorbed gas from said first bath, passing withdrawn liquid to a second bath, discharging a stream of air at high velocity downwardly to penetrate deeply into said second bath whereby the bath is violently agitated and physically absorbed gas is released therefrom, withdrawing scrubbing liquid substantially free from physically absorbed gas from said second bath, adding air and gas released from said bath to the cleaned gas stream from said first bath, and passing the combined gas stream upwardly in countercurrent to a flow of cool scrubbing liquid.

3. The method of treating hot dust-laden gases containing sulphur dioxide which comprises the steps of discharging a stream of gas vertically downwardly at high velocity to penetrate deeply into a bath of water and reversing the direction of gas flow within the bath whereby the gas stream is cooled and cleaned and sulphur dioxide is physically absorbed by the water, maintaining a relatively constant volume of water in the bath, withdrawing scrubbing water containing absorbed sulphur dioxide from the bath to the first of a series of stripping baths, passing water and sulphur dioxide physically absorbed therein sequentially to each of the series of stripping baths, discharging air at high velocity to penetrate into the water in the last of the series of stripping baths whereby the water is violently agitated and physically absorbed sulphur dioxide is released therefrom, withdrawing air and released sulphur dioxide from contact with the bath and discharging this gas mixture at high velocity into the next preceding bath of the series of stripping baths whereby the water therein is violently agitated and physically absorbed sulphur dioxide is released therefrom, withdrawing the mixture of air and released sulphur dioxide from contact with the last mentioned bath, repeating the discharging and withdrawing operations for each bath in the series in sequence countercurrent to the flow of water therethrough, adding the gas mixture from the first of the series of stripping baths to the reversed gas stream from the first mentioned bath, passing the combined gas stream upwardly countercurrent to a continuous flow of cool water, and discharging water substantially free from physically absorbed sulphur dioxide from the last of the series of stripping baths.

4. In a process for treating industrial gases in which a gas stream is cleaned by contact with a scrubbing liquid which absorbs part of the gas, the method of recovering physically absorbed gas which comprises passing scrubbing liquid containing physically absorbed gas in sequence through a series of baths of scrubbing liquid, discharging a stream of air at high velocity downwardly into the last of the series of baths of scrubbing liquid whereby the bath of scrubbing liquid is violently agitated and physically absorbed gas is released, withdrawing air and released gas from contact with the bath of scrubbing liquid and discharging a stream of this gas mixture at high velocity downwardly into the next preceding bath of scrubbing liquid of the series whereby the bath of scrubbing liquid is violently agitated and physically absorbed gas is released, withdrawing the mixture of air and released gas from the last mentioned bath of scrubbing liquid, and repeating the gas discharging and withdrawing operation for each bath in the series in sequence countercurrent to the flow of scrubbing liquid therethrough, separating the mixture of air and released gas from the first bath of the series, and withdrawing scrubbing liquid substantially free from physically absorbed gas from the last bath of the series.

References Cited in the file of this patent

UNITED STATES PATENTS

| | | |
|---|---|---|
| 158,265 | Fales | Dec. 29, 1874 |
| 308,083 | Maguin | Nov. 18, 1884 |
| 970,654 | Sepulchre | Sept. 20, 1910 |
| 1,543,942 | Mathesius | June 30, 1925 |
| 1,724,421 | Richter | Aug. 13, 1929 |
| 1,751,103 | Schroeder | Mar. 18, 1930 |
| 2,086,778 | Peffer et al. | July 12, 1937 |
| 2,250,925 | Babcock | July 29, 1941 |
| 2,409,558 | Gunn | Oct. 15, 1946 |
| 2,621,754 | Doyle | Dec. 16, 1952 |

FOREIGN PATENTS

| | | |
|---|---|---|
| 286,622 | Great Britain | June 5, 1929 |